US012663939B2

(12) United States Patent
Honda

(10) Patent No.: US 12,663,939 B2
(45) Date of Patent: Jun. 23, 2026

(54) METHOD FOR TIERING DATA BASED ON READ FREQUENCY

(71) Applicant: Kioxia Corporation, Tokyo (JP)

(72) Inventor: Keigo Honda, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 13 days.

(21) Appl. No.: 18/775,129

(22) Filed: Jul. 17, 2024

(65) Prior Publication Data

US 2025/0028478 A1 Jan. 23, 2025

(30) Foreign Application Priority Data

Jul. 21, 2023 (JP) ................................ 2023-119086

(51) Int. Cl.
*G06F 3/06* (2006.01)

(52) U.S. Cl.
CPC .......... *G06F 3/0655* (2013.01); *G06F 3/0604* (2013.01); *G06F 3/0679* (2013.01)

(58) Field of Classification Search
CPC ..... G06F 3/0655; G06F 3/0604; G06F 3/0679
See application file for complete search history.

(56) References Cited

U.S. PATENT DOCUMENTS

| | | |
|---|---|---|
| 7,859,932 B2 | 12/2010 | Mokhlesi |
| 2012/0297121 A1 | 11/2012 | Gorobets et al. |

| | | | |
|---|---|---|---|
| 2017/0371559 A1* | 12/2017 | Higgins | ................ G06F 3/0611 |
| 2019/0294365 A1 | 9/2019 | Yoshii et al. | |
| 2019/0303019 A1 | 10/2019 | Sunata et al. | |
| 2021/0057025 A1* | 2/2021 | Lee | ........................ G11C 16/26 |
| 2022/0035735 A1* | 2/2022 | Bhardwaj | ........... G06F 12/0246 |
| 2022/0076753 A1 | 3/2022 | Sharma et al. | |

(Continued)

FOREIGN PATENT DOCUMENTS

| | | |
|---|---|---|
| JP | 2012-513072 A | 6/2012 |
| JP | 2014-513850 A | 6/2014 |

(Continued)

OTHER PUBLICATIONS

C. Lee et al., "F2FS: A New File System for Flash Storage", 13th USENIX Conference on File and Storage Technologies (FAST '15), Feb. 16-19, 2015—Santa Clara, CA, USA; URL: https://www.usenix.org/system/files/conference/fast15/fast15-paper-lee.pdf.

(Continued)

*Primary Examiner* — Nicholas A. Paperno
(74) *Attorney, Agent, or Firm* — Foley & Lardner LLP

(57) ABSTRACT

A storage device includes a non-volatile memory, and a controller. The non-volatile memory includes a first region including first data readable with a number of voltage application times being equal to one or two, and a second region including second data readable with a number of voltage application times being equal to or more than three. The controller includes read frequency information. The controller is configured to control writing, based on the read frequency information, a first segment with a first number of issuance times being equal to or more than a reference value to the first region or the second region, and a second segment with a second number of issuance times being less than the reference value to the second region.

19 Claims, 15 Drawing Sheets

(56)                References Cited

U.S. PATENT DOCUMENTS

| | | |
|---|---|---|
| 2022/0157387 A1 | 5/2022 | Hara et al. |
| 2022/0283912 A1* | 9/2022 | Jung .................... G11C 29/765 |

FOREIGN PATENT DOCUMENTS

| | | | |
|---|---|---|---|
| JP | 2019-053814 A | 4/2019 |
| JP | 2019-168822 A | 10/2019 |
| JP | 2019-179455 A | 10/2019 |
| JP | 6710298 B2 | 6/2020 |
| JP | 6968016 B2 | 11/2021 |
| JP | 2022-081399 A | 5/2022 |

OTHER PUBLICATIONS

Gunhee Choi et al., "A New LSM-style Garbage Collection Scheme for ZNS SSDs", HotStorage'20: Proceedings of the 12th USENIX Conference on Hot Topics in Storage and File Systems, USENIX, Jul. 2020.
The kernel development community, "ZoneFS—Zone filesystem for Zoned block devices"; https://docs.kernel.org/filesystems/zonefs.html.

* cited by examiner

| Segment Number | Read Count | Read Flag |
|---|---|---|
| 1 | 100 | Hot |
| 2 | 2 | Cold |
| 3 | 5 | --- |
| 4 | 10 | --- |

| Page | Data | | | | | | | | | | | | | | | | |
|---|---|---|---|---|---|---|---|---|---|---|---|---|---|---|---|---|---|
| | S0 | S1 | S2 | S3 | S4 | S5 | S6 | S7 | S8 | S9 | S10 | S11 | S12 | S13 | S14 | S15 | |
| Top | 1 | 1 | 1 | 1 | 1 | 0 | 0 | 0 | 0 | 0 | 1 | 1 | 0 | 0 | 0 | 1 | 4 |
| Upper | 1 | 1 | 0 | 0 | 0 | 0 | 0 | 0 | 1 | 1 | 1 | 1 | 1 | 1 | 0 | 0 | 3 |
| Middle | 1 | 1 | 1 | 0 | 0 | 0 | 0 | 1 | 1 | 0 | 0 | 0 | 0 | 1 | 1 | 1 | 4 |
| Lower | 1 | 0 | 0 | 0 | 1 | 1 | 0 | 0 | 0 | 0 | 0 | 1 | 1 | 1 | 1 | 1 | 4 |

| Page | 2-2-3 | | | | | | | | 3-3-1 | | | | | | | | |
|---|---|---|---|---|---|---|---|---|---|---|---|---|---|---|---|---|---|
| | Data | | | | | | | | | | | | | | | | |
| | S0 | S1 | S2 | S3 | S4 | S5 | S6 | S7 | S8 | S9 | S10 | S11 | S12 | S13 | S14 | S15 | |
| Top | 1 | 0 | 0 | 0 | 0 | 1 | 1 | 1 | 1 | 1 | 0 | 0 | 0 | 1 | 1 | 0 | 5 |
| Upper | 1 | 1 | 1 | 0 | 0 | 0 | 0 | 1 | 1 | 0 | 0 | 1 | 1 | 1 | 0 | 0 | 5 |
| Middle | 1 | 1 | 0 | 0 | 1 | 1 | 0 | 0 | 0 | 0 | 0 | 0 | 1 | 1 | 1 | 1 | 4 |
| Lower | 1 | 1 | 1 | 1 | 1 | 1 | 1 | 1 | 0 | 0 | 0 | 0 | 0 | 0 | 0 | 0 | 1 |

FIG. 13

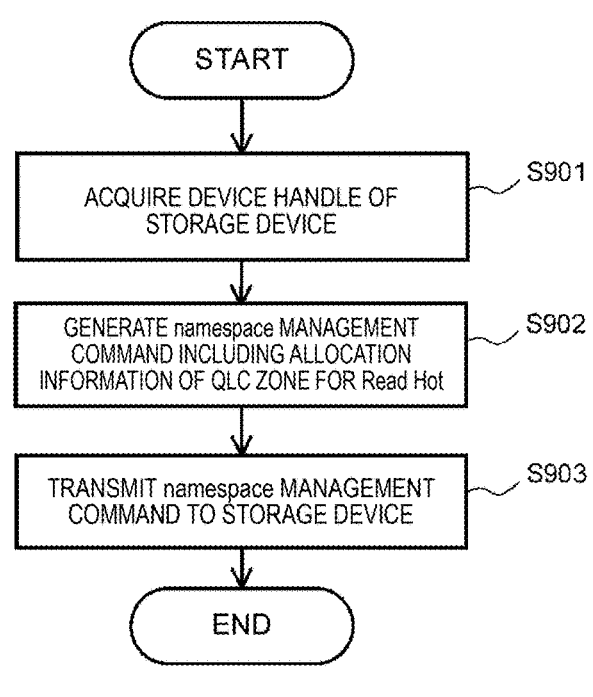

START

ACQUIRE DEVICE HANDLE OF STORAGE DEVICE — S901

GENERATE namespace MANAGEMENT COMMAND INCLUDING ALLOCATION INFORMATION OF QLC ZONE FOR Read Hot — S902

TRANSMIT namespace MANAGEMENT COMMAND TO STORAGE DEVICE — S903

END

FIG. 14

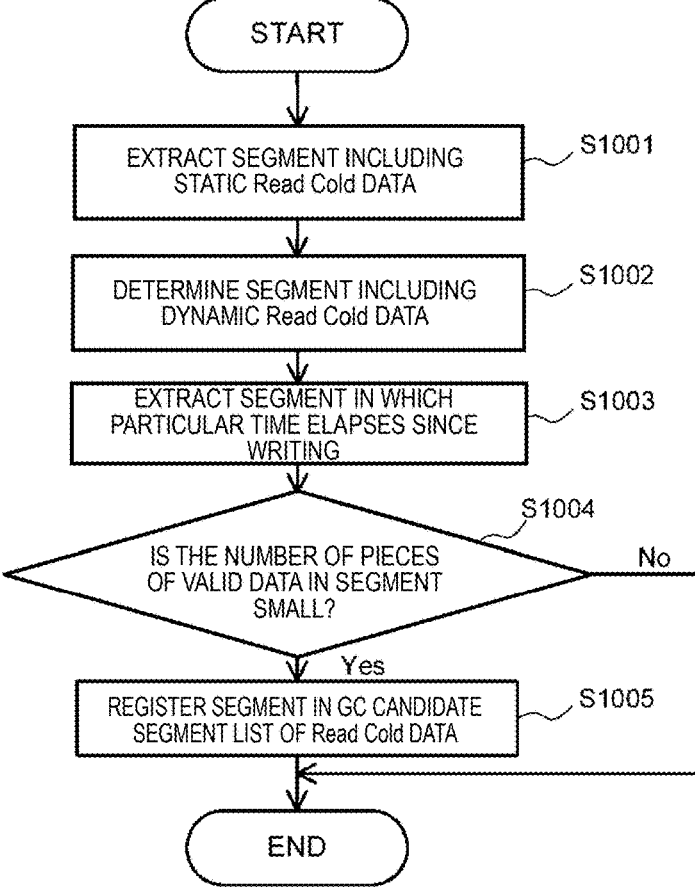

START

EXTRACT SEGMENT INCLUDING STATIC Read Cold DATA — S1001

DETERMINE SEGMENT INCLUDING DYNAMIC Read Cold DATA — S1002

EXTRACT SEGMENT IN WHICH PARTICULAR TIME ELAPSES SINCE WRITING — S1003

IS THE NUMBER OF PIECES OF VALID DATA IN SEGMENT SMALL? — S1004

No

Yes

REGISTER SEGMENT IN GC CANDIDATE SEGMENT LIST OF Read Cold DATA — S1005

END

FIG. 20

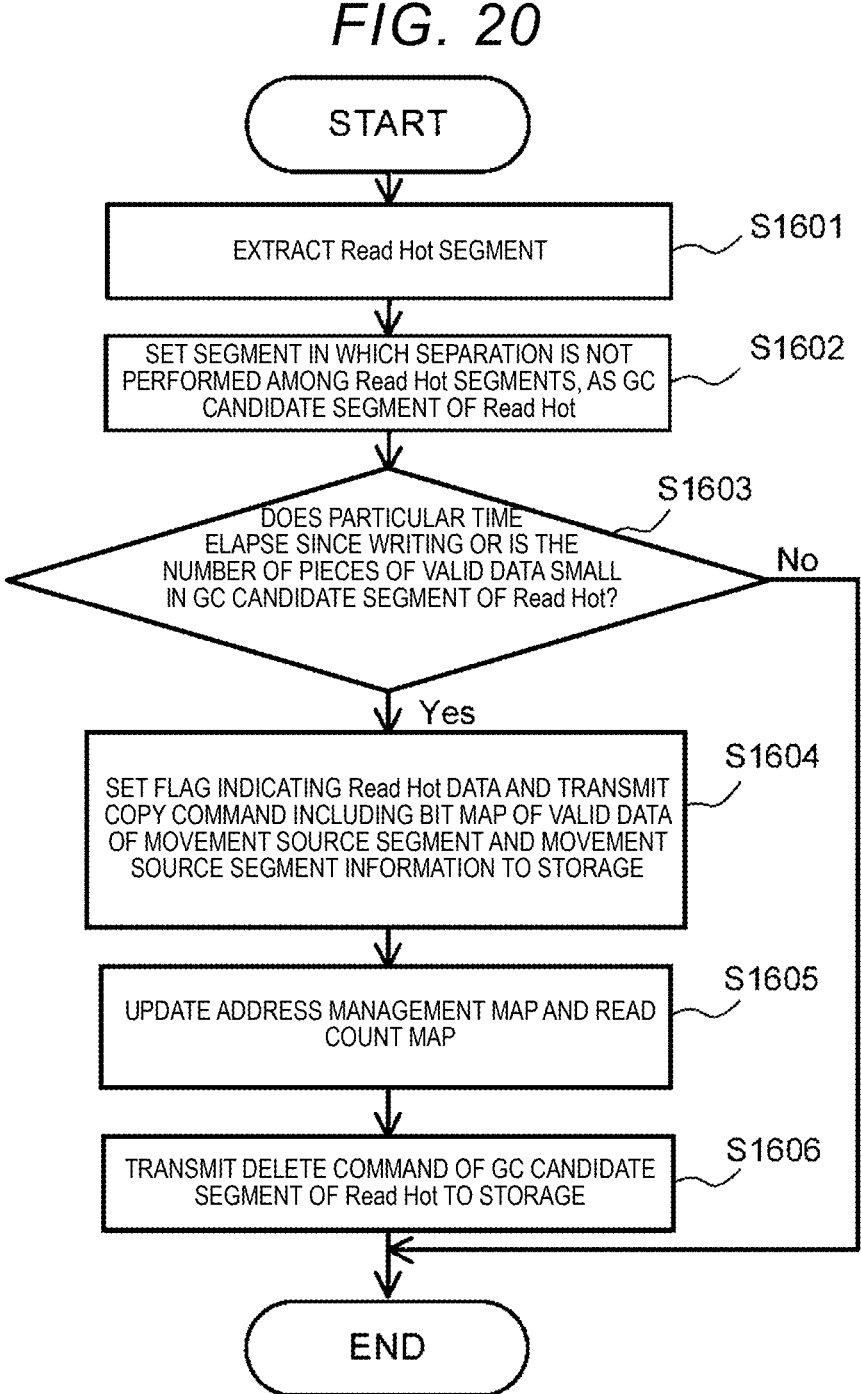

START

EXTRACT Read Hot SEGMENT — S1601

SET SEGMENT IN WHICH SEPARATION IS NOT PERFORMED AMONG Read Hot SEGMENTS, AS GC CANDIDATE SEGMENT OF Read Hot — S1602

DOES PARTICULAR TIME ELAPSE SINCE WRITING OR IS THE NUMBER OF PIECES OF VALID DATA SMALL IN GC CANDIDATE SEGMENT OF Read Hot? — S1603

No

Yes

SET FLAG INDICATING Read Hot DATA AND TRANSMIT COPY COMMAND INCLUDING BIT MAP OF VALID DATA OF MOVEMENT SOURCE SEGMENT AND MOVEMENT SOURCE SEGMENT INFORMATION TO STORAGE — S1604

UPDATE ADDRESS MANAGEMENT MAP AND READ COUNT MAP — S1605

TRANSMIT DELETE COMMAND OF GC CANDIDATE SEGMENT OF Read Hot TO STORAGE — S1606

END

METHOD FOR TIERING DATA BASED ON READ FREQUENCY

CROSS-REFERENCE TO RELATED APPLICATION

This application is based upon and claims the benefit of priority from Japanese Patent Application No. 2023-119086, filed Jul. 21, 2023, the entire contents of which are incorporated herein by reference.

FIELD

Embodiments described herein relate generally to a storage device, a host device, and an information processing system.

BACKGROUND

With a development of mass media, particularly a spread of the Internet, an amount of information presented to people is increasing exponentially. Sensing technology using IoT or a utilization of large-scale data represented by deep learning has been actively developed, and an amount of information accumulated daily is progressively increasing. By hierarchically managing such data according to an update frequency, a performance of data writing has been greatly improved in a file system and a database.

DESCRIPTION OF THE DRAWINGS

FIG. 13 is a flowchart showing an example of an initialization operation of a storage device according to the first embodiment of the present disclosure.

FIG. 14 is a flowchart showing an example of a registering operation of Read Cold data in a garbage collection candidate segment list according to the first embodiment of the present disclosure.

FIG. 20 is a flowchart showing a copy operation example of Read Hot data according to a third embodiment of the present disclosure.

DETAILED DESCRIPTION

Figure 1:
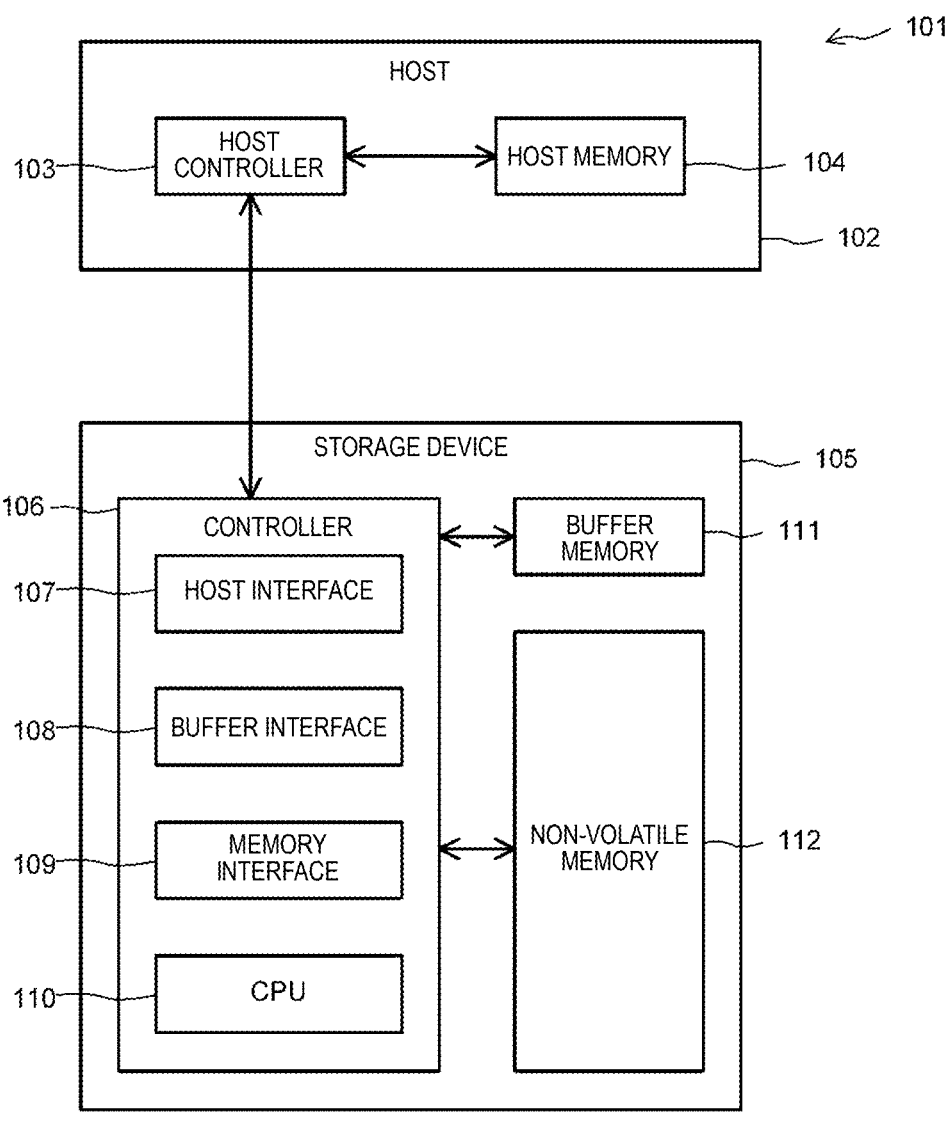
FIG. 1 is a block diagram showing a hardware configuration of an information processing system according to a first embodiment of the present disclosure.

Embodiments provide a storage device, a host device, and an information processing system capable of improving an average latency and throughput.

In general, according to one embodiment, a storage device includes a non-volatile memory and a controller. The non-volatile memory includes a first region including first data readable with a number of voltage application times being equal to one or two, and a second region including second data readable with a number of voltage application times being equal to or more than three. The controller comprises read frequency information indicating a number of issuance times of a read command for each of segments of a read request unit. The controller is configured to control writing, based on the read frequency information: a first segment with a first number of issuance times being equal to or more than a reference value to the first region or the second region; and a second segment with a second number of issuance times being less than the reference value to the second region.

In the following description, data with a high read frequency is referred to as "Read Hot", and data with a low read frequency is referred to as "Read Cold". In addition, a classification of "Read Hot" and "Read Cold" is referred to as Hot Cold separation. The information processing system according to the embodiment arranges data with a high read frequency in a page (a region in which the number of voltage application times is one or two) in which the number of voltage application times is small during a data reading in a Gray coding of a NAND of a quad level cell (QLC) or a multi-valued than the QLC. Similarly, the information processing system according to the embodiment arranges data with a low read frequency in a page (a region in which the number of voltage application times is equal to or more than three) in which the number of voltage application times is large during the data reading in the Gray coding of the NAND of the QLC or the multi-valued than the QLC. Here, the Gray coding is a coding method in which a Hamming distance between adjacent codes before and after is coded to be always 1. A Gray-coded code changes by only 1 bit when the code changes from a certain value to an adjacent value.

In addition, the storage device in the information processing system according to the embodiment includes an interface for receiving information indicating that data is Read Hot from a host. Further, a size of a region where the Read Hot data is placed is designated by the host through the interface.

First Embodiment

The information processing system according to a first embodiment implements the Hot Cold separation based on a read frequency of a segment. Based on a result of the Hot Cold separation, the information processing system stores data with a high read frequency in a region (SLC zone) in which a reading by the storage device is fast, and stores data with a low read frequency in a region (QLC zone) in which the reading by the storage device is slow.

FIG. 1 shows a configuration of an information processing system 101 according to the first embodiment. The information processing system 101 according to the first embodiment includes a host 102 and a storage device 105.

The host 102 is, for example, an information processing device shown as an example of a server, a personal computer, an on-vehicle device, or a mobile device. The host 102 issues a specific command and transmits the command to the storage device 105.

The storage device 105 is a device that permanently stores data using the non-volatile memory. The storage device 105 is a flash memory or an SSD for an embedded application in accordance with a UFS standard, an eMMC standard, an NVMe standard, or the like. The storage device 105 is communicably connected to the host 102. The storage device 105 functions as an external storage device with respect to the host 102. The storage device 105 executes data writing, reading, erasing, copying, and the like in response to a received command.

The host 102 has a host controller 103 and a host memory 104.

The host controller 103 is hardware connected to the storage device 105. The host controller 103 may be implemented as, for example, an SoC. The host controller 103 includes a CPU (not shown) and performs processing for issuing a command to be transmitted to the storage device 105.

The host memory 104 is, for example, a volatile memory shown as an example such as a DRAM. The host memory 104 stores data used for processing of the host controller 103.

The storage device 105 has a controller 106, a buffer memory 111, and a non-volatile memory 112.

The controller 106 is hardware that implements access to the non-volatile memory 112. The controller 106 receives a command from the host 102 and executes data processing.

The controller 106 may receive a command (hereinafter, referred to as "write command") for requesting write processing from the host 102.

The buffer memory 111 is, for example, a volatile memory shown as an example such as an SRAM or a DRAM. The buffer memory 111 functions as a memory that temporarily stores write data input from the host 102. In addition, the buffer memory 111 functions as a memory that temporarily stores reading data read from the non-volatile memory 112 before the reading data is transferred to the host 102.

The non-volatile memory 112 is a memory element capable of maintaining stored contents even without power supply from an outside. The non-volatile memory 112 may be configured with, for example, a NAND-type flash memory. The non-volatile memory 112 has a flash controller and a plurality of flash memory chips (not shown). The flash controller is a functional unit or circuit that controls writing, reading, and erasing of data with respect to the flash memory chip. The flash memory chip is an element configured to write bit data to a large number of memory cells arranged in a chip, read the written data, or erase the written data in units of blocks.

The controller 106 has a host interface 107, a buffer interface 108, a memory interface 109, and a CPU 110.

The host interface 107 is a controller (e.g. circuit) that controls communication with the host 102. The host interface 107 functions as an interface connected to the host 102.

The buffer interface 108 is a controller (e.g. circuit) that controls access to the buffer memory 111 of the controller 106.

The memory interface 109 is a controller (e.g. circuit) that controls communication with the non-volatile memory 112. The memory interface 109 is connected to the non-volatile memory 112 via a bus.

The CPU 110 is a central processing unit. The CPU 110 interprets and executes a command received by the host interface 107.

Functional Configuration

Figure 2:
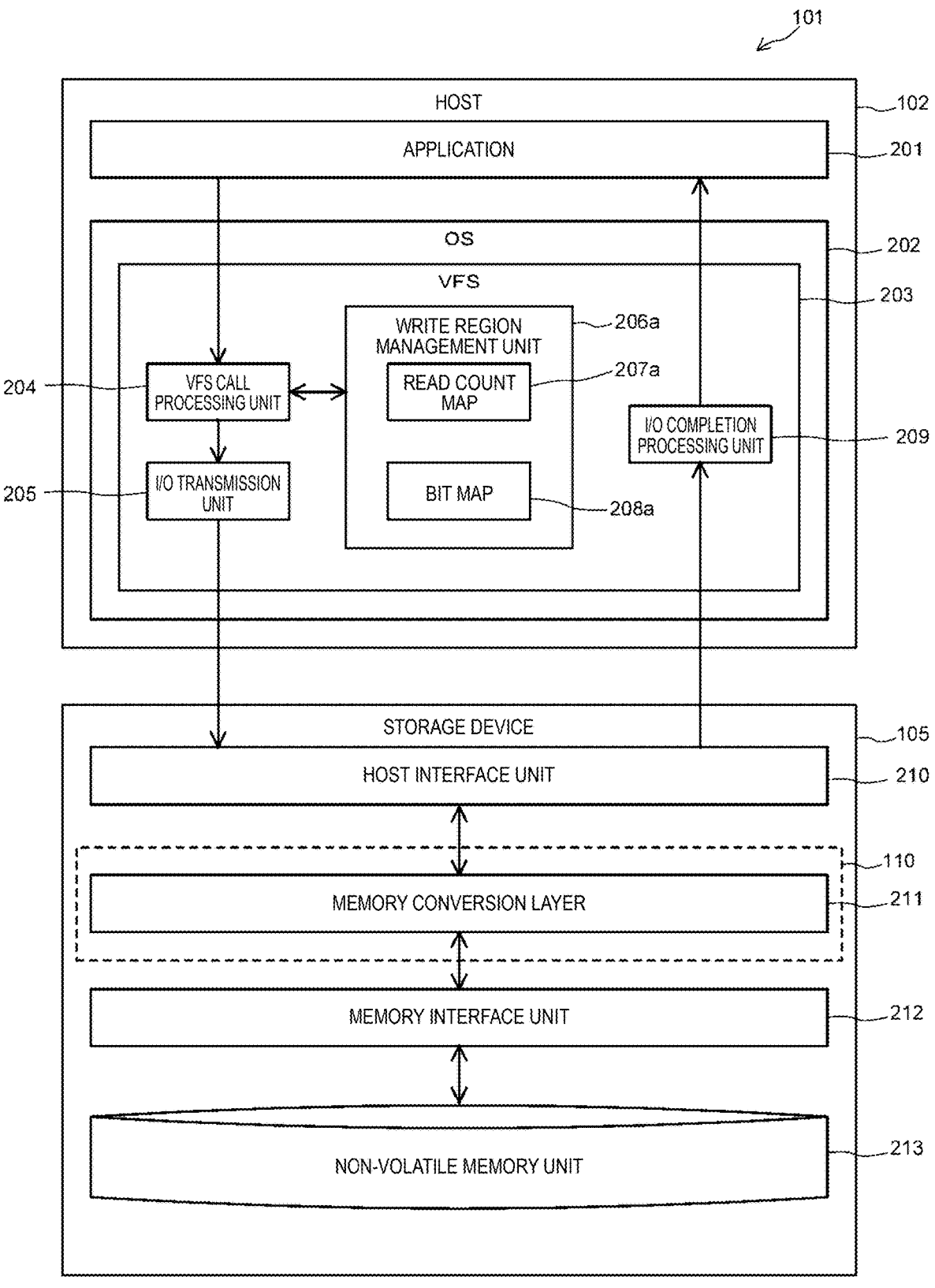
FIG. 2 is a block diagram showing a functional configuration of the information processing system according to the first embodiment of the present disclosure.

A functional configuration of the information processing system 101 according to the embodiment will be described with reference to FIG. 2. FIG. 2 is a block diagram showing the functional configuration of the information processing system. As described above, the information processing system 101 according to the first embodiment includes the host 102 and the storage device 105.

First, a function of the host 102 will be described. The host 102 has an application 201 and an OS 202 as functions.

The application 201 is a functional unit that accesses to data in the storage device 105. The application 201 issues a VFS call to the OS 202 to execute data access. The VFS call is communication for requesting execution of reading, writing, and the like with respect to a virtual file system (VFS) to be described later, which is one of functions of the OS 202.

The OS 202 is a functional unit that constitutes a core system of the host 102. The OS 202 manages a device operation or a process operation. The OS 202 has a VFS 203 as the one of the functions.

The VFS 203 is a functional unit that constitutes a virtual file system that mediates between the application 201 and an entity file system. The VFS 203 receives the VFS call issued by the application 201.

The VFS 203 includes a VFS call processing unit 204, an I/O transmission unit 205, a write region management unit 206a, and an I/O completion processing unit 209.

The VFS call processing unit 204 is a functional unit that processes the VFS call issued by the application 201. The VFS call includes, for example, a command such as read or write.

The I/O transmission unit 205 is a functional unit that generates a transmission command based on the VFS call processed by the VFS call processing unit 204. The I/O transmission unit 205 transmits the generated transmission command to the storage device 105.

The write region management unit 206a is a functional unit that manages data stored in a region such as a Logical Block Addressing (LBA), a Stream, or a Zone of the storage device 105 in segments of writing, reading, or data erasing units. Data indicated by the LBA and data size of a segment may be the same. In the example shown in FIG. 2, the write region management unit 206a is shown as an example of a function in the OS 202, but the present disclosure is not limited thereto. The write region management unit 206a may also be implemented as a functional unit of the application 201 such as a database.

The I/O completion processing unit 209 is a functional unit that receives a command processing completion notification sent from the storage device 105 and notifies the application 201 of a completion of the VFS call.

The write region management unit 206a includes a read count map 207a and a bit map 208a.

The read count map 207a is a functional unit that stores a count value of the number of executing times of a read command with respect to a segment. The read count map 207a may be referred to when data movement occurs in garbage collection (that is compaction) or wear leveling, and may be used to classify data based on a read frequency.

The bit map 208a is a functional unit that manages valid data included in the segment. The bit map 208a may be used to select a region in which data is moved in garbage collection or wear leveling.

Next, a function of the storage device 105 will be described. The storage device 105 has a host interface unit 210, a memory conversion layer 211, a memory interface unit 212, and a non-volatile memory unit 213 as functions.

The host interface unit 210 is a functional unit that interprets the transmission command transmitted by the I/O transmission unit 205 and executes storage or acquisition of data for the non-volatile memory unit 213. The host interface unit 210 issues a command processing completion notification when a content of the transmission command is executed.

The memory conversion layer 211 of the CPU 110 is a functional unit that converts a logical address into a physical address.

The memory interface unit 212 is a functional unit that executes access to the non-volatile memory unit 213 based on the physical address converted by the memory conversion layer 211.

The non-volatile memory unit 213 is a functional unit that stores data.

Modification Example of Information Processing System

Figure 3:
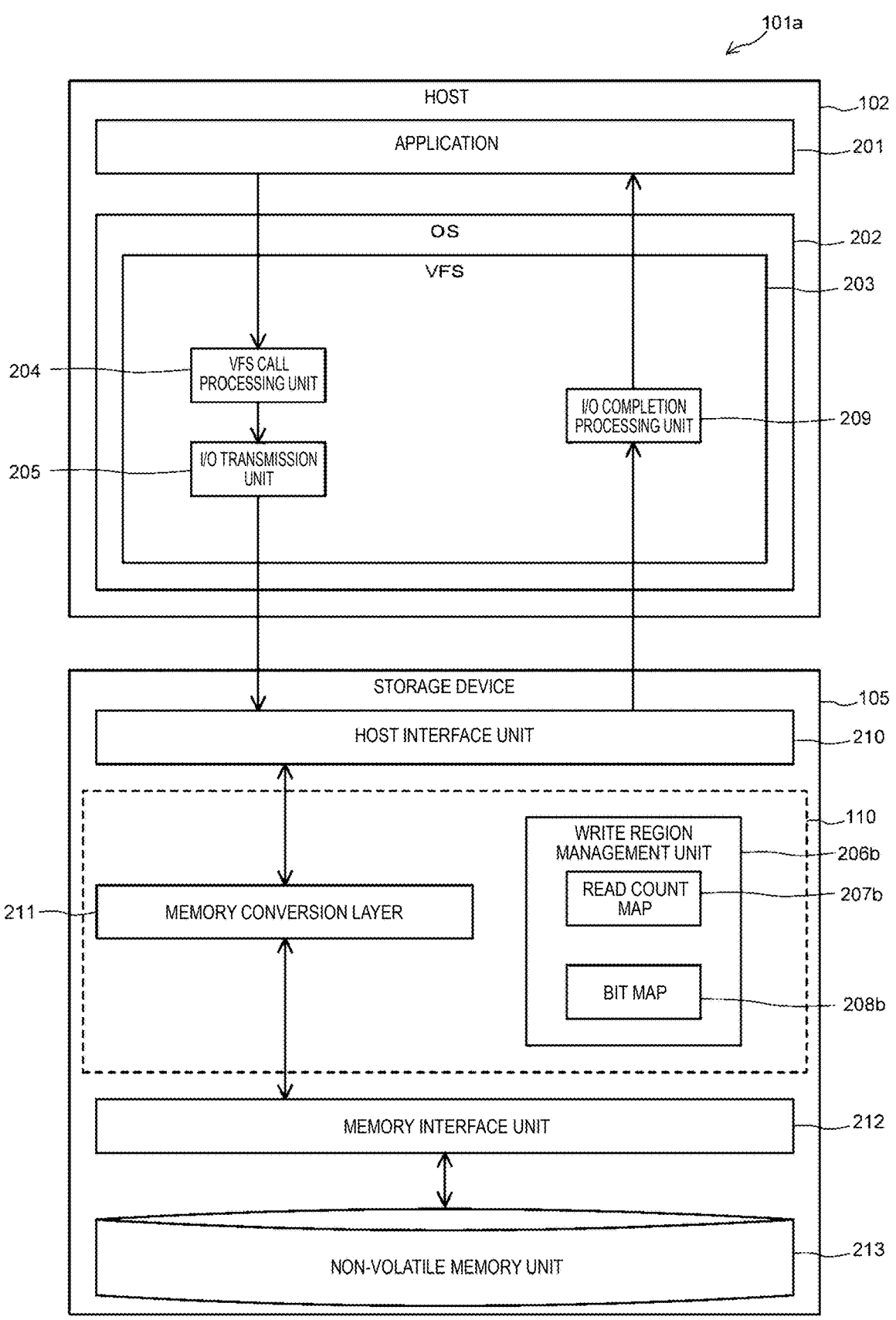
FIG. 3 is a block diagram showing a modification example of the functional configuration of the information processing system according to the first embodiment of the present disclosure.

Here, a functional configuration of a modification example of the information processing system 101 according to the embodiment will be described with reference to FIG. 3. FIG. 3 is a block diagram showing the modification example of the functional configuration of the information processing system. An information processing system 101a of the modification example is provided with a write region management unit 206b as a function of the CPU 110 in the storage device 105 instead of the write region management unit 206a of the VFS 203 in the host 102. In the following description, elements similar to the information processing system 101 are denoted by the same reference numerals, and redundant descriptions will not be shown.

As shown in FIG. 3, in the information processing system 101a of the modification example of the embodiment, the CPU 110 of the storage device 105 includes the write region management unit 206b.

The write region management unit 206b is a functional unit corresponding to the write region management unit 206a in FIG. 2 and has a similar function. The write region management unit 206b manages data stored in a region such as an LBA, a Stream, or a Zone by segments of writing, reading, or data erasing units.

The write region management unit 206b includes a read count map 207b and a bit map 208b. The read count map 207b and the bit map 208b correspond to the read count map 207a and the bit map 208a, and have a similar function, respectively.

The information processing system 101a may include both the write region management unit 206a on the VFS 203 and the write region management unit 206b on the CPU 110. In this situation, depending on the interface (for example, PCIe) to be adapted, either the host 102 or the storage device 105 may function as a master.

Figures 4, 5:
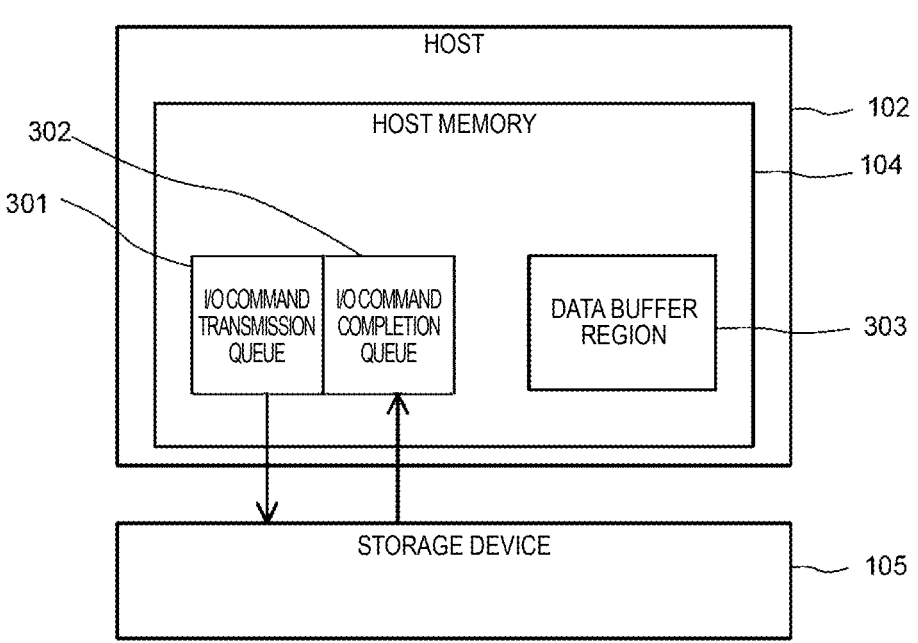
FIG. 4 is a block diagram showing a configuration of a host memory of the information processing system according to the first embodiment of the present disclosure.
FIG. 5 is a diagram showing a data structure of a read count map of the information processing system according to the first embodiment of the present disclosure.

With reference to FIG. 4, an example of a functional configuration of the host memory 104 of the host 102 will be described in detail. FIG. 4 is a block diagram showing a configuration of the host memory 104 of the information processing system according to the embodiment. The host memory 104 has an I/O command transmission queue 301, an I/O command completion queue 302, and a data buffer region 303. The functional configuration of the host memory 104 shown in FIG. 4 is an example, and the I/O command transmission queue 301 or the I/O command completion queue 302 may be implemented by hardware independent from the host memory 104.

The I/O command transmission queue 301 temporarily stores the command transmitted by the I/O transmission unit 205. The I/O command transmission queue 301 is, for example, a memory implemented by a ring buffer. The I/O command transmission queue 301 enqueues the issued command. The I/O command transmission queue 301 includes an entry. The entry may be managed by two variables called a Head and a Tail. The storage device 105 can specify a reference location of each queue based on a head pointer and a tail pointer. For example, a location of newly enqueued command information can be specified.

The I/O command completion queue 302 temporarily stores a completion notification of the VFS call which is notified by the I/O completion processing unit 209. The I/O command completion queue 302 is, for example, a memory implemented by a ring buffer. The I/O command completion queue 302 enqueues a VFS completion notification to be notified. The I/O command completion queue 302 includes the entry. The entry may be managed by two variables called a Head and a Tail. The host 102 can specify a reference location of each queue based on the head pointer and the tail pointer. For example, a location of the newly enqueued VFS completion notification can be specified.

The data buffer region 303 temporarily stores data to be written to the storage device 105 and data to be read from the storage device 105.

FIG. 5 shows a specific example of a data structure of the read count map 207a provided in the write region management unit 206a. The read count map 207a is information (read frequency information) in which a segment number 401, a read count 402, and a read flag 403 are correlated with each other. The read count map 207a may have a two-dimensional data structure. For example, the read count map 207a may have a data column of the read count 402 and a data column of the read flag 403.

Similarly, the write region management unit 206b has the read count map 207b. The read count map 207b has a similar configuration as that of the read count map 207a.

The segment number 401 is an entry that specifies a segment. In the example shown in FIG. 5, the segment number 401 has "1" as a leading entry 404a and "2" to "4" as subsequent entries 404b to 404d. That is, the segment number 401 has a unique value for each entry.

The read count 402 is an entry that stores a count result of the number of issuance times of a read command for each segment. In the example shown in FIG. 5, the read count 402 has a value of "100" as the leading entry 404a and values of "2", "5", and "10" as the subsequent entries 404b to 404d.

The read flag 403 is an entry that stores a determination result determined based on data stored in the column of the read count 402 by the write region management unit 206a or 206b. In the example shown in FIG. 5, as the determination result, an entry is performed, of which "Hot" indicates the Hot data in the entry 404a, and an entry is performed, of which "Cold" indicates the Cold data in the entry 404b.

That is, the read count maps 207a and 207b constituting the read frequency information may include information indicating the number of issuance times of the read command for each segment and information indicating any of the Hot data or the Cold data corresponding to the number of issuance times of the read command (information indicating read frequency).

In the example shown in FIG. 5, the read count 402 indicating the number of reading times in the entry 404d is 10. For example, when a setting of a reference value for determining the Hot data and the Cold data is 8, data stored in a segment of the entry 404d may be determined as the Read Hot data. When data movement occurs due to garbage collection or wear leveling when the entry 404d is determined to be the Read Hot data, the data of the segment is stored in the storage device 105 as the Read Hot data. In addition, a flag "Hot" is stored in the read count maps 207a or 207b as an entry of the read flag 403 of the entry 404d.

Write Region of Non-Volatile Memory

Figures 6, 7, 8:
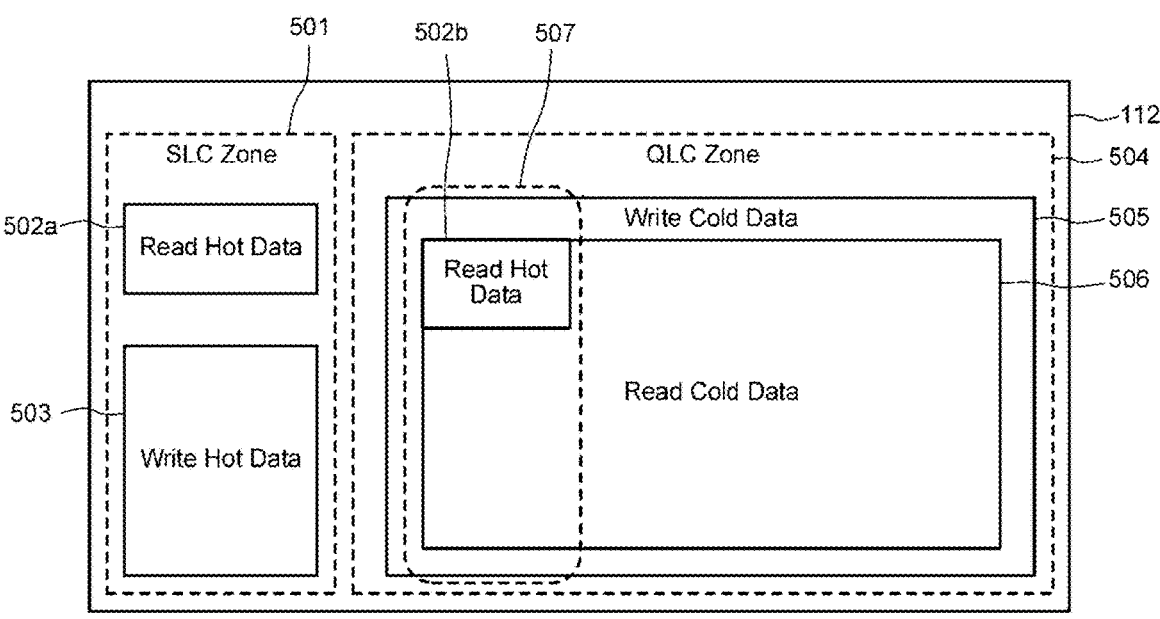
FIG. 6 is a diagram showing an outline of division of a write region in a non-volatile memory of the information processing system according to the first embodiment of the present disclosure.
FIG. 7 is a diagram showing an example of a bit arrangement of 4-4-3-4 Gray coding in the non-volatile memory of the information processing system according to the first embodiment of the present disclosure.
FIG. 8 is a diagram showing an example of a bit arrangement of 1-4-5-5 Gray coding in the non-volatile memory of the information processing system according to the first embodiment of the present disclosure.

With reference to FIG. 6, division of a write region of the non-volatile memory 112 and data attributes corresponding to divided regions will be described. FIG. 6 is a diagram showing an outline of the division of the write region of the non-volatile memory 112. As shown in FIG. 6, the non-volatile memory 112 is a NAND-type flash memory that may include an SLC zone 501 and a QLC zone 504. That is, the non-volatile memory 112 may include regions in which the number of bits to be written per cell is different. The SLC zone 501 is a region of an SLC method in which one bit is stored in one cell. The QLC zone as a multi-valued cell region is a region of a QLC method in which 4 bits are stored in one cell.

As shown in FIG. 6, the SLC zone 501 may store Read Hot data 502a with a high read frequency and Write Hot data 503 with a high overwrite frequency. By writing these data to the SLC zone, a write performance is improved while there is space in the SLC zone, and a read performance of the data is improved. On the other hand, when a data movement from the SLC zone 501 to the QLC zone 504 frequently occurs, an I/O performance is degraded, and a writing/erasing cycle of the NAND-type flash memory is accelerated. This is a factor that increases the number of cells with a high data error rate.

As shown in FIG. 6, the QLC zone 504 may store Write Cold data 505 with a low overwrite frequency. Furthermore, it is possible to classify the Write Cold data 505 into Read Hot data 502b and Read Cold data 506. The Read Hot data 502b is stored in a Read Hot data storage region 507.

That is, Read Hot data 502a and 502b according to a first segment in which the number of issuance times of a read command for each segment is equal to or more than a reference value (high read frequency) are written to cells (first cells) in the SLC zone 501 (first region) and the QLC zone 504 (second region) The Read Cold data 506 according to a second segment, in which the number of issuance times of a read command for each segment is less than the reference value (read frequency less than that of Read Hot data 502a, 502b), is written to a cell (second cell) in the QLC zone 504 (second region).

Data Writing and Coding Method Selection

When multi-valued data is written into one cell of the NAND-type flash memory, appropriate Gray coding is selected according to an error rate or a read speed during a reading. As an example, when the QLC method is described, it is desirable that a read latency of each page of the QLC method is the same to ensure a QoS of the storage device 105.

FIG. 7 is a diagram showing an example of a bit arrangement when a 4-4-3-4 coding is adopted. In FIG. 7, S0 to S15 are threshold value distributions in a threshold value region. It is possible to represent the bit arrangement after writing is performed to the cell, in 16 ways from S0 to S15 depending on states of the threshold value distributions. The 4-4-3-4 coding is coding in which four boundaries are distributed to a Lower page, four boundaries are distributed to a Middle page, three boundaries are distributed to an Upper page, and four boundaries are distributed to a Top page, when 15 boundaries among 16 threshold value regions are distributed to four pages. This coding is distributed to reduce a deviation in the number of boundaries among pages.

As shown in FIG. 7, bits are assigned for the Top, Upper, Middle, and Lower pages with respect to each threshold value distribution. A situation when data is read from only the Lower page is taken as an example, a bit inversion occurs between S0 and S1, S3 and S4, S5 and S6, and S10 and S11 of the threshold value distribution, so that it is necessary to perform at least four determinations in order to determine a state of the bit.

Meanwhile, FIG. 8 is a diagram showing an example of a bit arrangement when a 1-4-5-5 coding is adopted. The 1-4-5-5 coding is coding in which one boundary is distributed to a Lower page, four boundaries are distributed to a Middle page, five boundaries are distributed to an Upper page, and five boundaries are distributed to a Top page, when 15 boundaries among 16 threshold value regions are distributed to four pages.

A situation when data is read only from the Lower page is taken as an example, the bit inversion occurs only between S7 and S8 of the threshold value distribution, thereby the state of the bit may be determined by performing at least one determination. By adopting the 1-4-5-5 coding, the number of determination times for determining the bit can be significantly reduced. High-speed data read and write are implemented by writing the Read Hot data 502b to the Lower page. Meanwhile, by writing the Read Cold data 506 to the Top page, the Upper page, and the Middle page, an influence of a read time in which a performance of the entire system is slightly increased is less likely to be affected.

In addition, a randomization of the SLC is performed with respect to the Lower page, and a randomization of the TLC is performed from S0 to S7 and from S8 to S15 for the rest of the Lower page, so that writing concentrated on a specific threshold value distribution can be avoided, and a lifetime of a NAND cell can be made uniform.

Although the 1-4-5-5 coding is shown as the example in the description of the embodiment, the present disclosure is not limited thereto. The same effect can be obtained when coding in which data is readable by the number of determination times (the number of voltage application times) of one or two.

Figure 9:
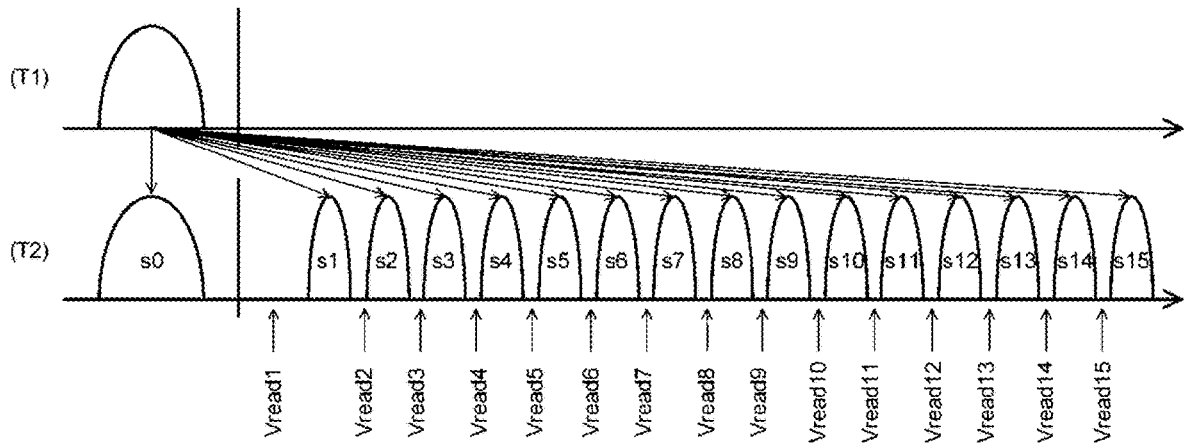
FIG. 9 is a diagram showing a threshold value region after data is programmed in the non-volatile memory according to the first embodiment of the present disclosure.

FIG. 9 is a diagram showing an example of a threshold value region when data of the QLC method is written to the NAND-type flash memory. In FIG. 9, "(T1)" indicates an erasing state, and "(T2)" indicates a state in which QLC data is written. The threshold value distribution from S0 to S15 in FIG. 9 corresponds to S0 to S15 shown in FIGS. 7 and 8.

Threshold value voltages Vread1 to Vread15 are set among each of distributions, and the threshold value distribution is determined, so that a value written to a page is determined in conjunction with a bit allocation by the coding in FIG. 7 or 8. For example, the threshold value voltage Vread8 is applied, and it is determined that the distribution is from S0 to S7 when a current flows into a bit line, and the distribution is from S8 to S15 when the current does not flow into the bit line. When the 1-4-5-5 coding of FIG. 8 is adopted, the data reading of the Lower page can be completed by applying a voltage of the threshold value voltage Vread8 once.

Figure 10:
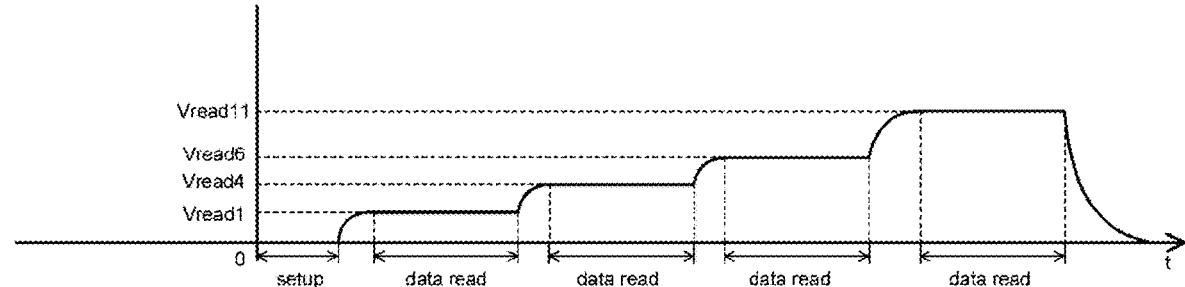
FIG. 10 is a diagram showing an example of a voltage waveform applied to a word line during data reading of a Lower page in a cell written by 4-4-3-4 Gray coding in the non-volatile memory.

FIG. 10 is a diagram showing an example of a voltage waveform applied to a word line during the data reading of the Lower page when the 4-4-3-4 coding shown in FIG. 7 is used. In FIG. 10, a time t at which the storage device 105 receives the command is 0. In FIG. 10, a time from reception of the command to an application of the voltage is a setup time such as a transfer of an address (in the drawing, "setup"). Thereafter, threshold value voltages which are at boundaries where bits are inverted on the Lower page in FIG. 7, are applied in an order of Vread1, Vread4, Vread6, and Vread11 to read the data.

Figure 11:
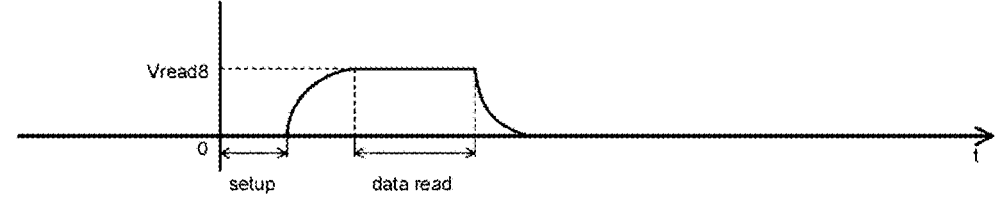
FIG. 11 is a diagram showing an example of a voltage waveform applied to a word line during data reading of a Lower page in a cell written by 1-4-5-5 Gray coding in the non-volatile memory.

FIG. 11 is a diagram showing an example of a voltage waveform applied to a word line during the data reading of the Lower page when the 1-4-5-5 coding shown in FIG. 8 is used. In FIG. 11 as well, the time t at which the storage device 105 receives the command is 0. After the setup (in the drawing, "setup"), the data is read by applying the threshold value voltage Vread8 at the boundary where the bit is inverted on the Lower page in FIG. 8. That is, as compared with the example shown in FIG. 10, a time for applying the voltage during a reading is significantly reduced, and a high-speed reading of the Read Hot data 502b is enabled.

Command Processing Operation

Figure 12:
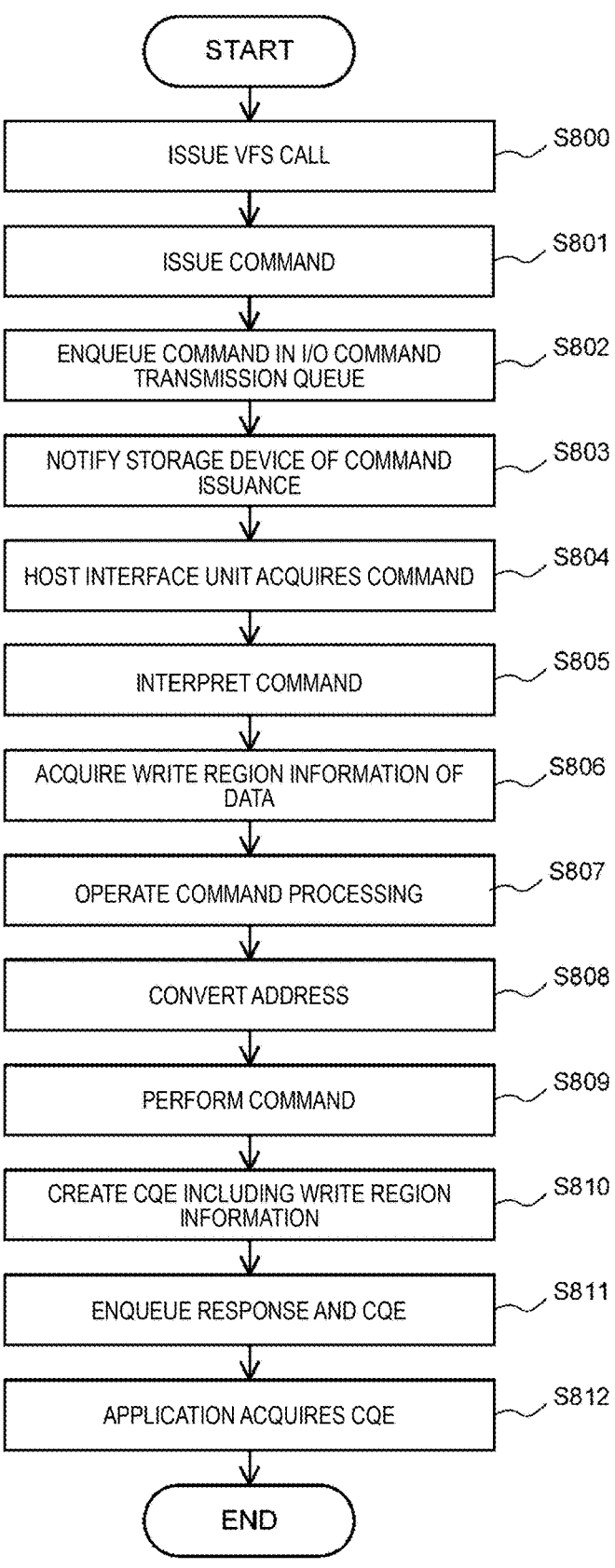
FIG. 12 is a flowchart showing a command processing operation of the information processing system according to the first embodiment of the present disclosure.

Next, a command processing operation of the information system according to the embodiment will be described with reference to FIG. 12. FIG. 12 is a flowchart showing the command processing operation of the information system.

The application 201 issues the VFS call (S800). The VFS call may include a command request such as reading, writing, deleting, or copying.

When the VFS call is received, the VFS call processing unit 204 issues a corresponding command (S801).

The issued command is enqueued in the I/O command transmission queue 301 (S802).

The I/O transmission unit 205 notifies the storage device 105 of a command issuance (S803).

When the notification is received, the host interface unit 210 accesses to the I/O command transmission queue 301 to acquire a command (S804).

The host interface unit 210 interprets the received command (S805).

The host interface unit 210 acquires write region information of data (S806). The write region information is information on a region of the non-volatile memory 112, to which data is written when a read command or a delete command is used. When a write command or a copy command is used, write source information of the command includes the write region information.

The host interface unit 210 operates command processing based on the write region information (S807).

The memory conversion layer 211 converts an address according to command processing of the host interface unit 210 (S808).

The memory interface unit 212 performs reading, writing, and deleting of data with respect to the non-volatile memory 112 (S809). The memory interface unit 212 transmits data to the data buffer region 303 when the command is a read command. The memory interface unit 212 acquires data from the data buffer region 303 when the command is a write command.

The host interface unit 210 creates a CQE including the write region information when an execution of the command is completed (S810).

The host interface unit 210 accesses to the I/O command completion queue 302 and enqueues the CQE (S811). The host interface unit 210 notifies the I/O completion processing unit 209 of a completion of the command.

The I/O completion processing unit 209 notifies the application 201 of the completion of the VFS call based on the received notification. The application 201 can acquire an execution completion of the command by checking the I/O command completion queue 302 (S812).

Initialization Operation

Next, an initialization operation of the storage device 105 will be described with reference to FIG. 13. FIG. 13 is a flowchart showing an example of the initialization operation of the storage device 105. In the initialization operation, a size of the Read Hot data storage region 507 may also be set.

The host 102 acquires a device handle of the storage device 105 (S901).

When the device handle is acquired, the host 102 generates a namespace management command including allocation information of a QLC zone for Read Hot (S902).

The host 102 transmits the generated namespace management command with respect to the storage device 105 (S903). The storage device 105 that receives the namespace management command sets a QLC data region for Read Hot.

Registration of Read Cold Data

Next, an operation in which the write region management unit 206a registers the Read Cold data in a garbage collection (GC) candidate segment list will be described with reference to FIG. 14. FIG. 14 is a flowchart showing an example of a registering operation of the Read Cold data in the garbage collection candidate segment list.

The write region management unit 206a determines a GC candidate segment based on a time at which data is written to the non-volatile memory 112 and the bit map 208a. There are two main purposes of garbage collection, one is to stop I/O processing of the host 102 to perform the garbage collection in the foreground to secure space, and the other is to perform the garbage collection in the background at a timing when an I/O request is small to improve a performance of the storage device 105. A performance of the storage device can be improved by using the segment registered in the GC candidate segment list in the latter purpose of the garbage collection. Meanwhile, the segment may be used for the former purpose of the garbage collection.

The write region management unit 206a creates the GC candidate segment list based on the read count map 207a. The write region management unit 206a refers to the read count map 207a and extracts a segment including static Read Cold data of which a flag of Cold is set (S1001).

The write region management unit 206a refers to the read count map 207a and determines a segment among the segments where the Cold flag is not set, in which the number of reading times is less than the reference value, as a segment including dynamic Read Cold data (S1002).

The write region management unit 206a extracts a segment in which a particular time elapses since writing based on a creation time of a file or write time information to the non-volatile memory 112 included in a metadata region of the storage device (S1003).

When the number of pieces of valid data in the extracted segment is greater than the reference value (no in S1004), the processing is ended. When the number of pieces of valid data in the extracted segment is less than the reference value (yes in S1004), the segment is registered in the GC candidate segment list of the Read Cold data (S1005).

The same operation is also performed when the write region management unit 206b is provided instead of the write region management unit 206a or in addition to the write region management unit 206a. The write region management unit 206b refers to the read count map 207b and the bit map 208b and performs the similar processing.

Receiving Operation of Read Hot Data Write Command

Figure 15:
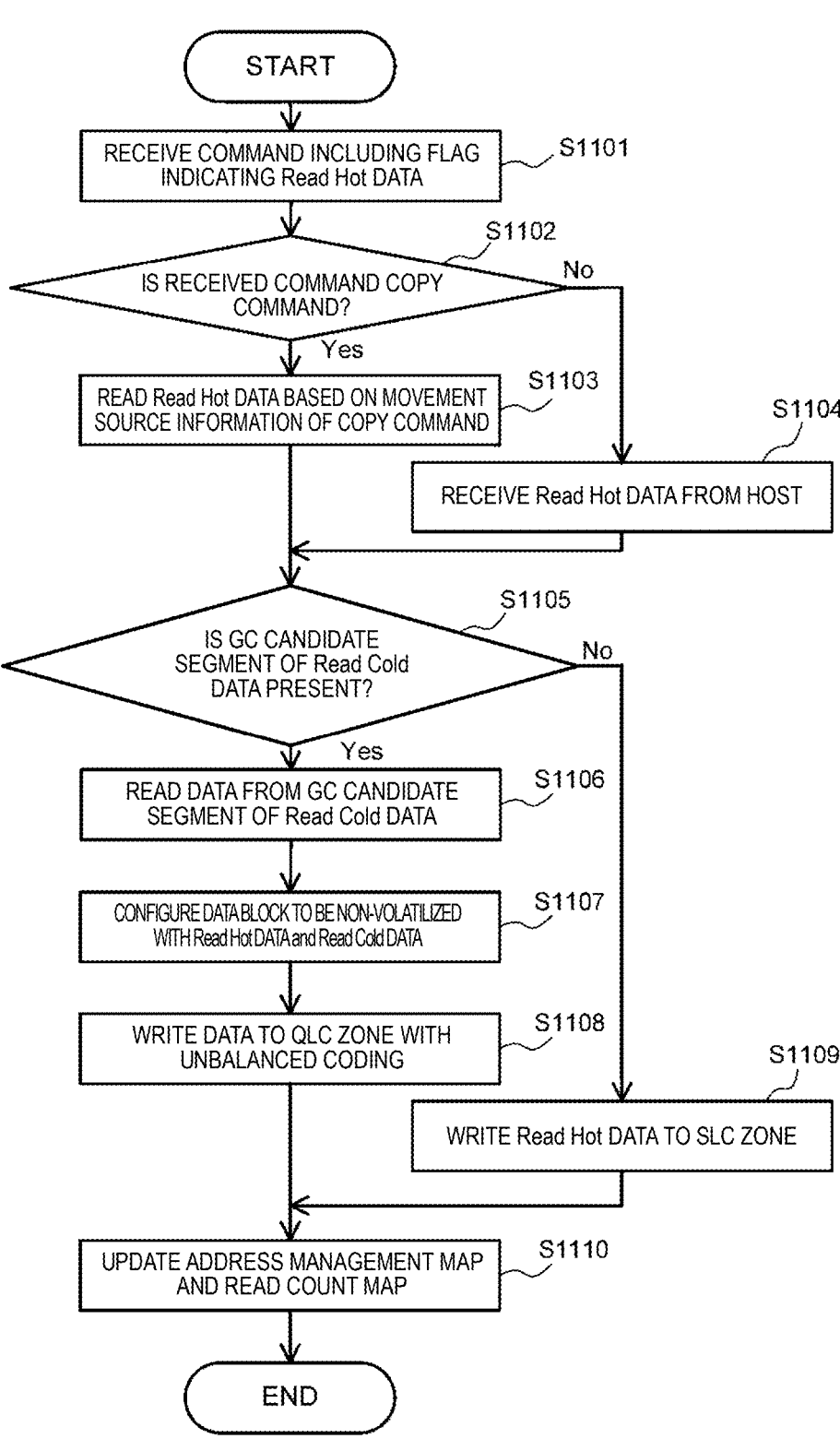
FIG. 15 is a flowchart showing an operation example of reception of a copy command including Read Hot data in the storage device according to the first embodiment of the present disclosure.

Next, an operation when the host interface 107 receives a write or copy command of the Read Hot data will be described with reference to FIG. 15. FIG. 15 is a flowchart showing an operation example of receiving of a copy command including Read Hot data in the storage device 105.

The host interface 107 accesses to the I/O command transmission queue 301 and receives a command including a flag indicating the Read Hot data (S1101). In the example shown in FIG. 5, the data corresponds to data (first segment) of a segment number 1.

The host interface 107 interprets the command and determines whether the command is a copy command (S1102).

When the command is the copy command (yes in S1102), the memory interface 109 reads the Read Hot data from the non-volatile memory 112 based on the movement source information included in the command (S1103).

When the command is not the copy command (no in S1102), the host interface 107 accesses to the host memory 104 and receives the Read Hot data from the host (S1104).

The CPU 110 determines whether the GC candidate segment (fourth segment) of the Read Cold data is registered in the GC candidate segment list of the Read Cold data (S1105).

When the GC candidate segment of the Read Cold data is registered in the GC candidate segment list of the Read Cold data (yes in S1105), the memory interface 109 reads the data from the GC candidate segment of the Read Cold data (S1106).

The CPU 110 configures a data block to be non-volatilized with the Read Hot data and the Read Cold data (S1107).

The memory interface 109 writes data to the QLC zone 504 (second region) with an unbalanced coding shown in FIG. 8 (S1108).

When the GC candidate segment of the Read Cold data is not registered in the GC candidate segment list of the Read Cold data (no in S1105), the CPU 110 writes the Read Hot data to the SLC zone 501 (first region) (S1109).

After the data writing is completed, the CPU 110 updates an address management map included in the memory conversion layer 211 and a read count map 207 included in the write region management unit 206 (S1110). The CPU 110 registers address information of newly written data, an invalidation of the original data moved by the garbage collection is performed, and setting of a flag of the Hot Cold data is performed.

With the information processing system 101 according to the embodiment, it is not necessary to wait for the host to write the Read Cold data required to configure the data block.

Receiving Operation of Write Command for Read Cold Data

Figure 16:
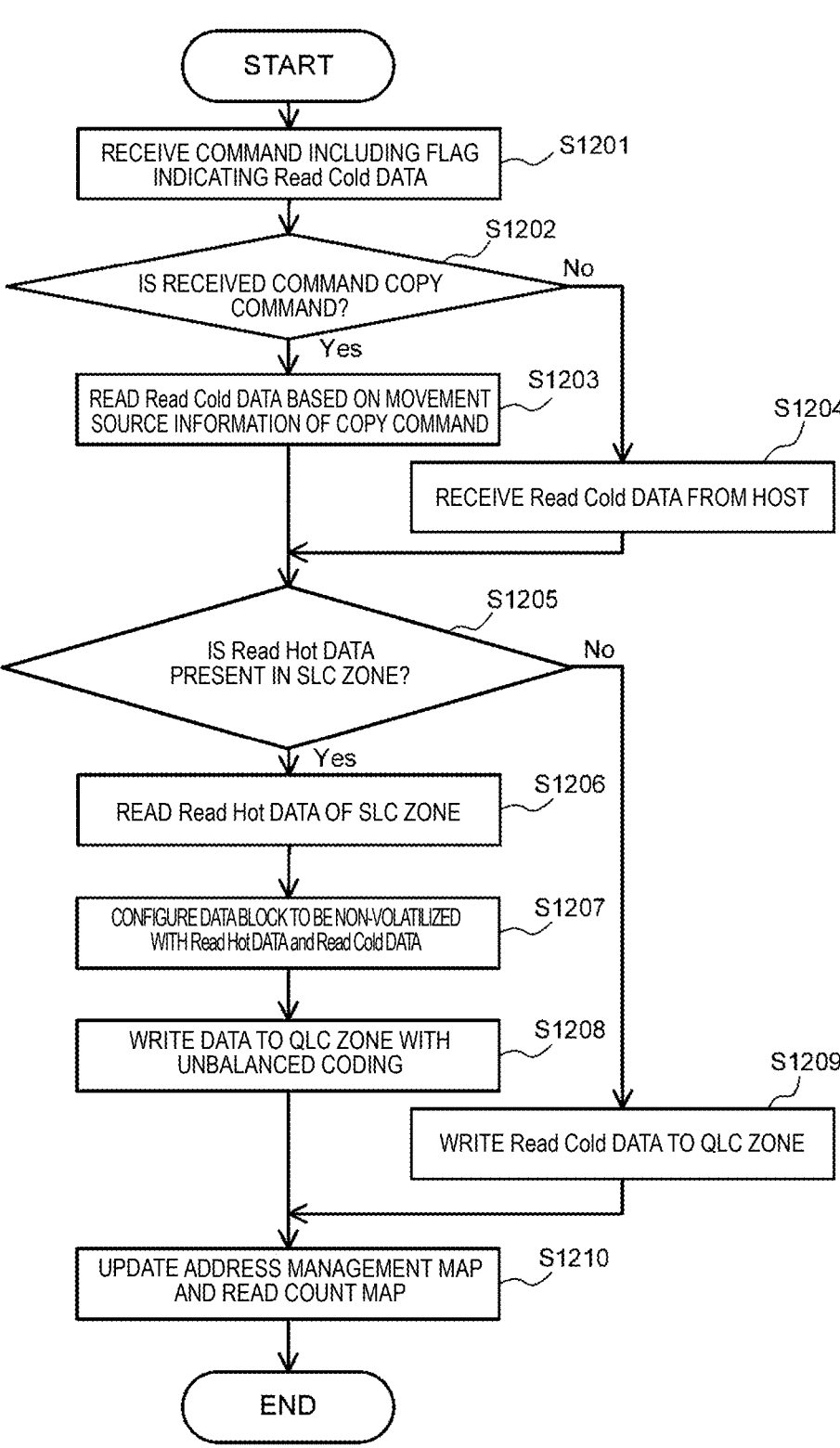
FIG. 16 is a flowchart showing an operation example of reception of a copy command including Read Cold data in the storage device according to the first embodiment of the present disclosure.

Next, an operation of the host interface 107 when the host interface 107 receives a write or copy command of the Read Cold data will be described with reference to FIG. 16. FIG. 16 is a flowchart showing an operation example of receiving of a copy command including Read Cold data in the storage device.

The host interface 107 accesses to the I/O command transmission queue 301 and receives a command including a flag indicating the Read Cold data (S1201). In the example shown in FIG. 5, the data corresponds to data (second segment) of a segment number 2.

The host interface 107 interprets the command and determines whether the command is a copy command (S1202).

When the command is the copy command (yes in S1202), the memory interface 109 reads the Read Cold data from the non-volatile memory 112 based on movement source information of the command (S1203).

When the command is not the copy command (no in S1202), the host interface 107 accesses to the host memory 104 and receives the Read Cold data from the host (S1204).

The CPU 110 determines whether Write Cold and Read Hot data (third segment) is present in the SLC zone 501 (S1205).

When the Write Cold and Read Hot data is present (yes in S1205), the Read Hot data of the SLC zone 501 is read (S1206).

The CPU 110 configures a data block to be non-volatilized with the Read Hot data and the Read Cold data (S1207).

The memory interface 109 writes data to the QLC zone 504 (second region) with the unbalanced coding shown in FIG. 8 (S1208).

When the Write Cold and Read Hot data is not present (no in S1205), the Read Cold data is written to the QLC zone 504 (second region) (S1209).

After the data writing is completed, the address management map included in the memory conversion layer 211 and the read count map 207 included in the write region management unit 206 are updated (S1210), the address information of the newly written data is registered, and then the invalidation of the original data moved by the garbage collection is performed, and a setting of a flag of Hot Cold is performed.

With the information processing system 101 according to the embodiment, it is not necessary to wait for the host to write the Read Hot data required to configure the data block.

Separation Operation Based on Read Frequency

Figure 17:
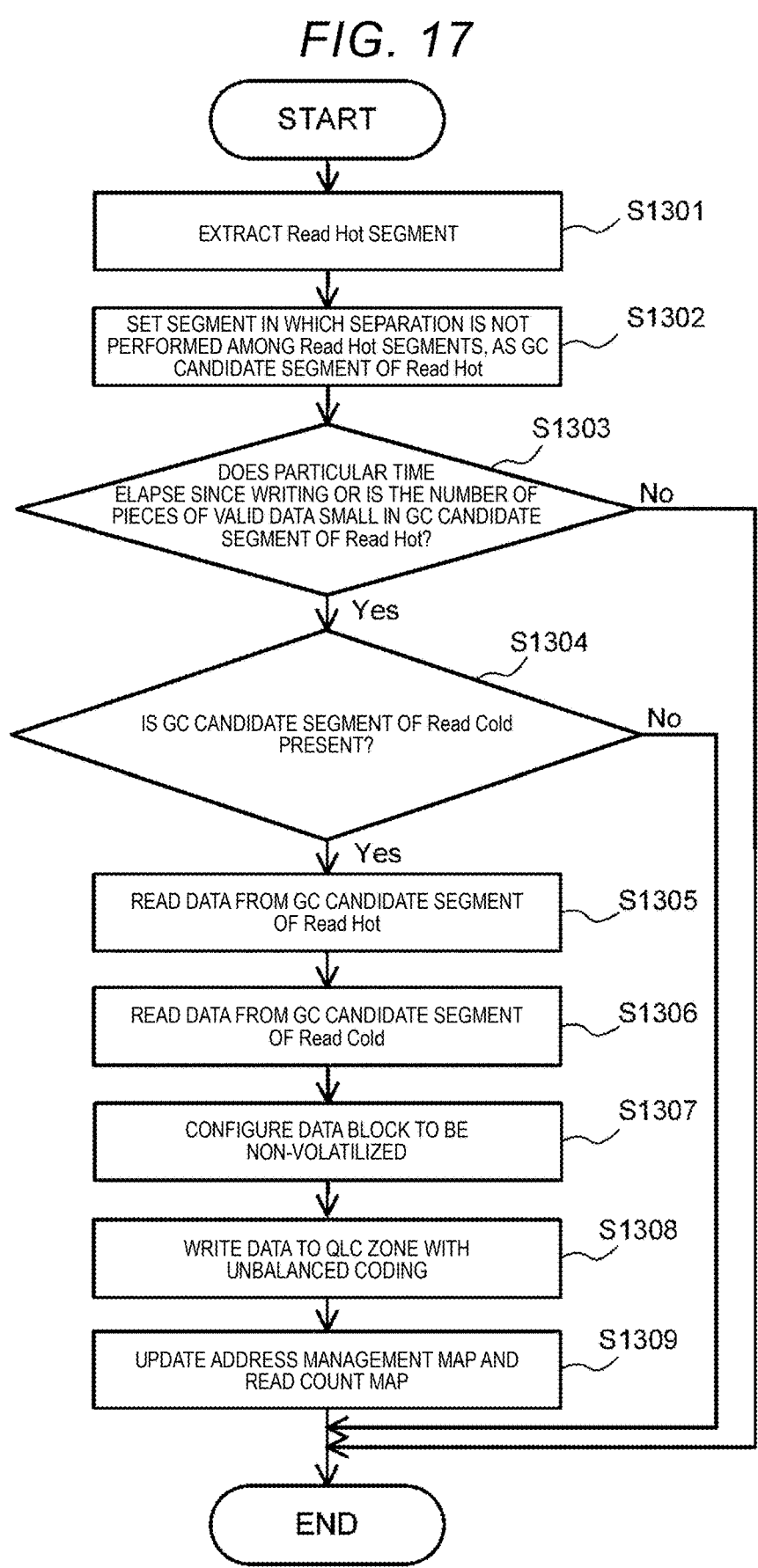
FIG. 17 is a flowchart showing an operation example of garbage collection of a CPU according to the first embodiment of the present disclosure.

Referring to FIG. 17, an operation of garbage collection that implements the Hot Cold separation based on a read frequency by the CPU 110 will be described. FIG. 17 is a flowchart showing an operation example of garbage collection in the CPU 110.

The CPU 110 refers to the read count map 207 and extracts a Read Hot segment (S1301).

In addition, the CPU 110 extracts a segment in which the Hot Cold separation is not performed, among Read Hot segments, as the GC candidate segment of Read Hot (S1302).

The CPU 110 determines whether a particular time elapses since the writing or whether the number of pieces of valid data is small for the GC candidate segment of Read Hot (S1303).

When a condition is not satisfied (no in S1303), the processing is ended. When the condition is satisfied (yes in S1303), the CPU 110 determines whether the GC candidate segment of Read Cold is present (S1304).

When the GC candidate segment of Read Cold is not present (no in S1304), the processing is ended. When the GC candidate segment of Read Cold is present (yes in S1304), the CPU 110 performs a flow of the garbage collection.

The memory interface 109 reads data from the GC candidate segment of Read Hot (S1305).

In addition, the CPU 110 reads the Read Cold data from the GC candidate segment of Read Cold (S1306).

The CPU 110 configures a data block to be non-volatilized with the Read Hot data and the Read Cold data (S1307).

The memory interface 109 writes data to the QLC zone 504 with the unbalanced coding shown in FIG. 8 (S1308).

After the data writing is completed, the CPU 110 updates the address management map included in the memory conversion layer 211 and the read count map 207 included in the write region management unit 206 (S1309), registers the address information of the newly written data, and then performs the invalidation of the original data moved by the garbage collection and performs setting of the flag of the Hot Cold.

With the information processing system 101 according to the embodiment of the present disclosure, high-speed reading can be implemented without shortening the writing/erasing cycle of a NAND.

In addition, the storage device in the information processing system 101 according to the embodiment of the present disclosure implements the Hot Cold separation based on a read frequency in which the host and the storage device are coordinated.

The information processing system 101 according to the embodiment of the present disclosure can improve an average latency and throughput. In the information processing system 101 according to the embodiment, a non-volatile memory has a region with a high read speed and a region with a low read speed in the same cell.

With the write region management unit according to the embodiment of the present disclosure, the storage device can determine Hot Cold and can implement a separation by the garbage collection or the wear leveling, even when the host does not explicitly instruct the read frequency of the data.

With the information processing system 101 according to the embodiment, the Hot data is placed in a region with a small read latency. The Hot data can implement a read latency approximately equal to that of a pseudo-SLC using the multi-level NAND as a SLC, although the Hot data is written to the QLC zone.

With the information processing system 101 according to the embodiment, a processing time required to create a data block in the garbage collection processed in the command reception and the background can be shortened.

With the information processing system 101 according to the embodiment, the average latency and throughput with respect to the read command after the background garbage collection is completed can be improved.

With the information processing system 101 according to the embodiment, the average latency and the throughput can be prevented from deteriorating by arranging the Read Cold data with respect to the page in which the unbalanced coding is adopted. Further, with the information processing system 101 according to the embodiment, by adopting the 1-4-5-5 coding or the like as the unbalanced coding, the tail latency can be prevented from being extremely increased.

Second Embodiment

Figure 18:
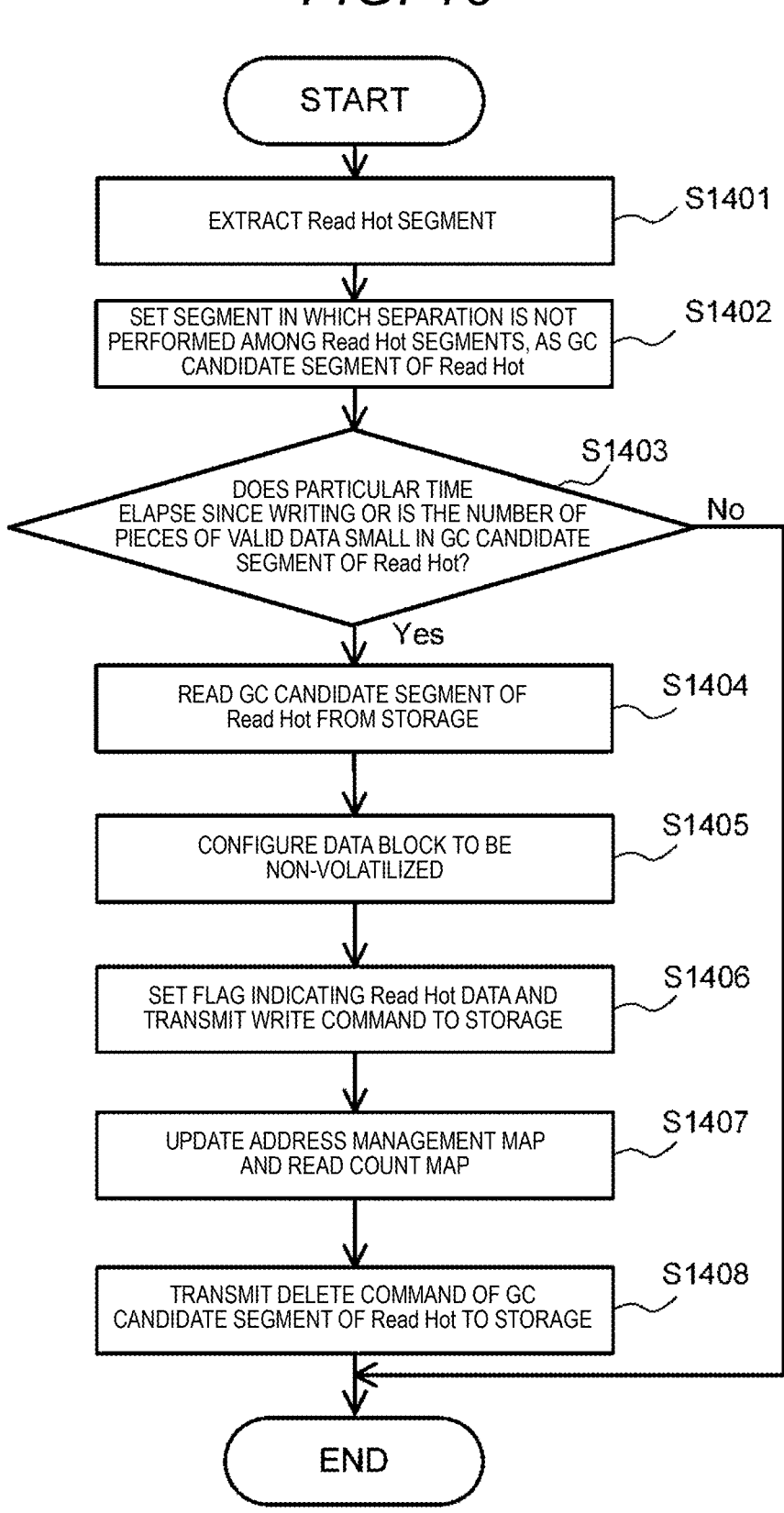
FIG. 18 is a flowchart showing an operation example of garbage collection according to a second embodiment of the present disclosure.

Subsequently, an operation of the second embodiment will be described in detail with reference to FIG. 18. FIG. 18 is a flowchart showing an operation example of a garbage collection according to the second embodiment. In the second embodiment, the garbage collection may be managed on a host side. For example, in a log structured file system (LSF), garbage collection managed by the host is referred to as Cleaning. Hereinafter, a garbage collection processing managed by the host is referred to as a Cleaning processing. In addition, in the following description, the same elements as those in the first embodiment are denoted by the same reference numerals, and redundant descriptions will not be shown.

The write region management unit 206a of the host 102 refers to the read count map 207a and extracts the Read Hot segment (S1401).

The write region management unit 206a extracts the segment in which the Hot Cold separation is not performed, among the Read Hot segments, as the GC candidate segment of Read Hot (S1402).

The write region management unit 206a determines whether a particular time elapses since the writing or whether the valid data is small for the GC candidate segment of Read Hot (S1403).

When a condition is not satisfied (no in S1403), the write region management unit 206a ends the processing. When the condition is satisfied (yes in S1403), the host 102 performs a Cleaning flow. The host 102 issues I/O and reads the GC candidate segment of Read Hot from the storage device 105 (S1404).

The host 102 configures a data block to be non-volatilized from the read Read Hot data (S1405).

The host 102 sets the flag indicating the Read Hot data, generates a write command to transmit the data with respect to the storage device 105 (S1406).

The host 102 registers the address information of the newly written data in association with the data movement, updates the address management map and the read count map 207a, and sets a flag of Read Hot (S1407).

After the update of the address management map, the host 102 transmits a delete command of the GC candidate segment of Read Hot to the storage device 105 to release the used region (S1408).

Figure 19:
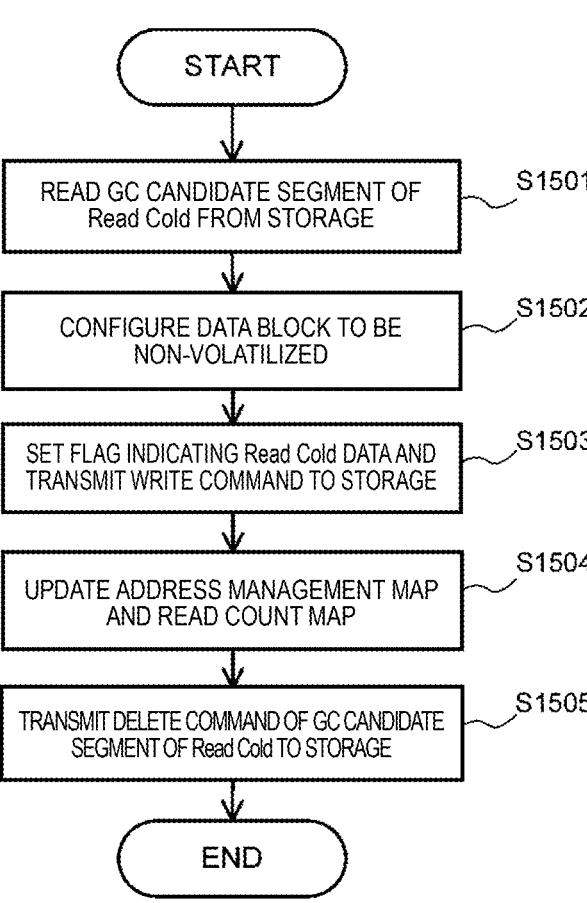
FIG. 19 is a flowchart showing a movement operation example of Read Cold data in a Cleaning processing according to the second embodiment of the present disclosure.

Subsequently, a movement of the Read Cold data in the Cleaning processing will be described with reference to FIG. 19. FIG. 19 is a flowchart showing a movement operation example of Read Cold data in the Cleaning processing according to the second embodiment.

The host 102 issues I/O with respect to the storage device 105 and reads the GC candidate segment of Read Cold (S1501).

The host 102 configures the data block to be non-volatilized from the read Read Cold data (S1502).

The host 102 sets the flag indicating the Read Cold data, and issues the write command to transmit the data with respect to the storage device 105 (S1503).

The host 102 registers the address information of the newly written data in association with the data movement, updates the address management map and the read count map 207, and sets a flag of Read Cold (S1504).

After the update of the address management map, the host 102 transmits a delete command of the GC candidate segment of Read Cold to the storage device 105 to release the used region (S1505).

With the information processing system 101 according to the embodiment, even in an information processing system that uses write-once storage such as Zoned Storage or in which the host takes a lead and performs GC, such as LSF, the Hot Cold Separation of reading is enabled, and the average read latency or throughput can be improved.

Third Embodiment

Subsequently, an operation of a third embodiment will be described in detail with reference to FIG. 20. FIG. 20 is a flowchart showing a copy operation example of Read Hot data according to the third embodiment. The third embodiment is an example in which a data copy command is implemented in the information processing system 101 where garbage collection is managed by the host. In addition, in the following description, the same elements as those in the first and second embodiments are denoted by the same reference numerals, and redundant descriptions will not be shown.

FIG. 20 shows an operation of moving the Read Hot data by issuing a copy command. The write region management unit 206a of the host 102 refers to the read count map 207 and extracts a Read Hot segment (S1601).

In addition, the write region management unit 206a extracts the segment in which the Hot Cold separation is not performed, among the Read Hot segments (S1602), as the GC candidate segment of Read Hot.

The host 102 determines whether a particular time elapses since the writing or whether the number of pieces of valid data is small for the GC candidate segment of Read Hot (S1603).

When the condition is not satisfied (no in S1603), the processing is ended. When the condition is satisfied (yes in S1603), the host 102 performs the Cleaning flow using the copy command. The host 102 sets the flag indicating the Read Hot data, generates a copy command including a bit map of valid data of a movement source segment and movement source segment information, and transmits the copy command to the storage device 105 (S1604).

The host 102 registers the address information of the newly written data in association with the data movement, updates the address management map and the read count map 207, and sets the flag of Read Hot (S1605).

After the update of the address management map, the host 102 transmits the delete command of the GC candidate segment of Read Hot to the storage device 105 to release the used region (S1606).

Figure 21:
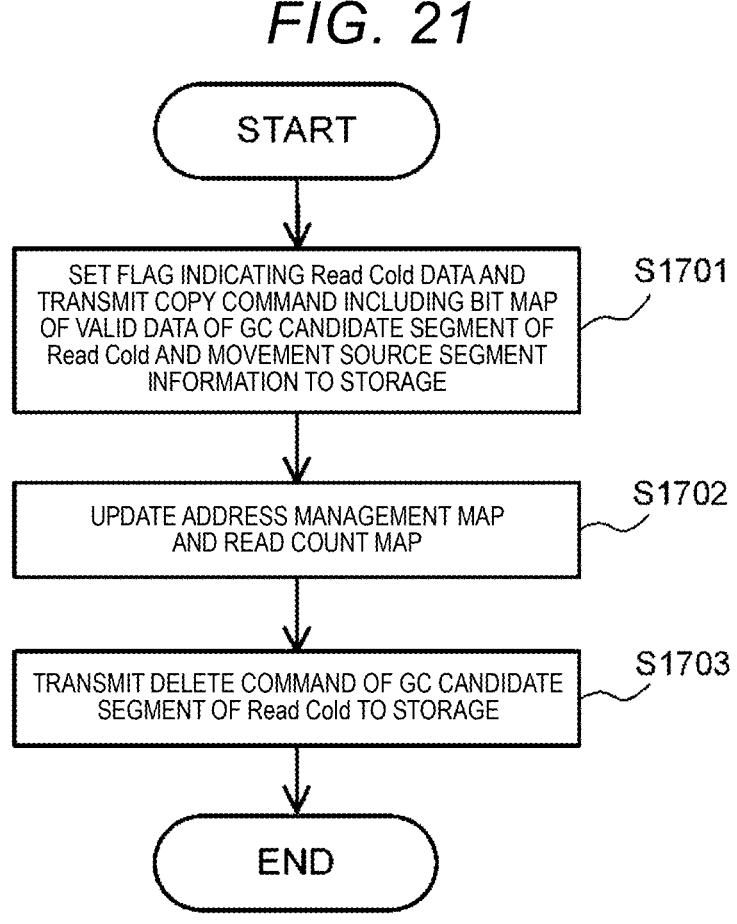
FIG. 21 is a flowchart showing a copy operation example of Read Cold data according to the third embodiment of the present disclosure.

Subsequently, an operation of moving the Read Cold data by issuing a copy command will be described with reference to FIG. 21. FIG. 21 is a flowchart showing a copy operation example of Read Cold data according to the third embodiment.

The host 102 sets the flag indicating the Read Cold data, generates the copy command including the bit map of the valid data of the movement source segment and the movement source segment information, and transmits the copy command to the storage device 105 (S1701).

The host 102 registers the address information of the newly written data in association with the data movement, updates the address management map and the read count map 207, and sets the flag of Read Cold (S1702).

After the update of the address management map, the host 102 transmits the delete command of the GC candidate segment of Read Cold to the storage device 105 to release the used region (S1703).

With the information processing system 101 according to the embodiment, a reduction in an amount of data transfer in I/O during GC processing, a reduction in a memory usage of the host, and a shortening of a processing time can be implemented.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A storage device, comprising:
a non-volatile memory; and
a controller, wherein
the non-volatile memory comprises:
a first region including first data readable with a number of voltage application times being equal to one or two; and
a second region including second data readable with a number of voltage application times being equal to or more than three,
the controller is configured to:
manage read frequency information indicating a number of issuance times of a read command for each of segments of a read request unit; and
control writing, based on the read frequency information:
a first segment with a first number of issuance times being equal to or more than a reference value to the first region or the second region; and
a second segment with a second number of issuance times being less than the reference value to the second region,
wherein
the controller is further configured to:
determine based on the read frequency information, whether to move a third segment stored in a third region, different from the first region and the second region, with a third number of issuance times being equal to or more than the reference value to the first region or the second region, and to move a fourth segment stored in a fourth region, different from any of the first region to the third region, with a fourth number of issuance times being less than the reference value to the second region; and control writing valid data of the third segment to the first region or the second region and control writing valid data of the fourth segment to the second region.

2. The storage device according to claim 1, wherein the controller is further configured to:

manage the read frequency information in a data write command; and execute garbage collection or wear leveling based on the stored read frequency information.

3. The storage device according to claim 1, wherein the controller is further configured to manage the read frequency information included in a received command; and when the first segment is received, the controller is further configured to read the fourth segment from the fourth region, control writing the first segment to the first region or the second region, and control writing the fourth segment to the second region.

4. The storage device according to claim 1, wherein the controller is further configured to manage the read frequency information included in a received command, and when the second segment is received, the controller is configured to read the third segment from the third region, control writing the third segment to the first region or the second region, and control writing the second segment to the second region.

5. The storage device according to claim 1, wherein the non-volatile memory includes a NAND-type flash memory.

6. A storage device, comprising:

a non-volatile memory; and a controller, wherein the non-volatile memory comprises:

a first region including first data readable with a number of voltage application times being equal to one or two; and a second region including second data readable with a number of voltage application times being equal to or more than three, the controller is configured to:

manage read frequency information indicating a number of issuance times of a read command for each of segments of a read request unit; and control writing, based on the read frequency information:

a first segment with a first number of issuance times being equal to or more than a reference value to the first region or the second region; and a second segment with a second number of issuance times being less than the reference value to the second region, wherein the non-volatile memory includes a first cell; and a second cell, the first cell having the first region and the second region, the second cell having the second region out of the first region and the second region, the controller is configured to:

receive a setting command of a namespace including allocation information of the first cell and the second cell; and allocate the first cell and the second cell to the non-volatile memory based on the setting command.

7. The storage device according to claim 6, wherein the storage device is connectable to a host device comprising:

a host controller configured to:

generate the read frequency information; and transmit a command including the generated read frequency information to the storage device and transmit the setting command of a namespace to the storage device.

8. The storage device according to claim 7, wherein the host controller is configured to transmit the command to the storage device to write valid data of the first segment to the first region.

9. The storage device according to claim 7, wherein the host controller is configured to transmit the command to the storage device to write valid data of the second segment to the second region.

10. The storage device according to claim 6, wherein the non-volatile memory includes a NAND-type flash memory.

11. An information processing system comprising:

the storage device according to claim 1; and a host device coupled to the storage device;

wherein the host device comprises:

a host controller configured to:

generate the read frequency information; and transmit a command including the generated read frequency information to the storage device and transmit a setting command of a namespace to the storage device.

12. The information processing system according to claim 11, wherein the controller is configured to:

store the read frequency information in a data write command; and execute garbage collection or wear leveling based on the stored read frequency information.

13. The information processing system according to claim 11, wherein the controller is configured to interpret the read frequency information included in a received command; and when the first segment is received, the controller is configured to read the fourth segment from the fourth region, control writing the first segment to the first region or the second region, and control writing the fourth segment to the second region.

14. The information processing system according to claim 11, wherein the controller is configured to interpret the read frequency information included in a received command, and when the second segment is received, the controller is configured to read the third segment from the third region, control writing the third segment to the first region or the second region, and control writing the second segment to the second region.

15. The information processing system according to claim 11, wherein the non-volatile memory includes a NAND-type flash memory.

16. The information processing system according to claim 11, wherein the storage device includes an SSD.

17. An information processing system comprising:

the storage device according to claim 6; and a host device coupled to the storage device, wherein the host device comprises a host controller configured to:

generate the read frequency information; and transmit a command including the generated read frequency information to the storage device and transmit a setting command of a namespace to the storage device.

18. The information processing system according to claim 17, wherein

19 the host controller is configured to transmit the command to the storage device to write valid data of the first segment to the first region.

19. The information processing system according to claim 17, wherein the host controller is configured to transmit the command to the storage device to write valid data of the second segment to the second region.

\*   \*   \*   \*   \*